US012413637B2

(12) United States Patent
Okamura et al.

(10) Patent No.: US 12,413,637 B2
(45) Date of Patent: Sep. 9, 2025

(54) DATA CENTER SYSTEM, INTER-BASE WORKLOAD CONTROL METHOD, AND INTER-BASE WORKLOAD CONTROL SYSTEM

(71) Applicant: Hitachi, Ltd., Tokyo (JP)

(72) Inventors: Taku Okamura, Tokyo (JP); Satoshi Kaneko, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/588,812

(22) Filed: Feb. 27, 2024

(65) Prior Publication Data
US 2024/0396963 A1 Nov. 28, 2024

(30) Foreign Application Priority Data

May 25, 2023 (JP) ................................ 2023-086288

(51) Int. Cl.
*G06F 15/16* (2006.01)
*H04L 67/1008* (2022.01)
*H04L 67/1012* (2022.01)

(52) U.S. Cl.
CPC ...... *H04L 67/1012* (2013.01); *H04L 67/1008* (2013.01)

(58) Field of Classification Search
CPC .................. H04L 67/1012; H04L 67/1008
USPC ........................................................ 709/203
See application file for complete search history.

(56) References Cited

U.S. PATENT DOCUMENTS

| 8,261,275 | B2 * | 9/2012 | Johnson ................ G06F 9/4881 |
| | | | 719/318 |
| 8,312,229 | B2 * | 11/2012 | Bloks .................... G06F 9/4887 |
| | | | 710/5 |
| 8,335,859 | B2 * | 12/2012 | Nagpal ................. G06F 9/5094 |
| | | | 709/239 |
| 8,732,267 | B2 * | 5/2014 | Banerjee ............... G06F 9/5072 |
| | | | 709/217 |
| 9,886,316 | B2 * | 2/2018 | Belady .................. G06F 9/5094 |

(Continued)

FOREIGN PATENT DOCUMENTS

JP 2021-189845 A 12/2021

OTHER PUBLICATIONS

Extended European Search Report received in corresponding European Application No. 24161463.5 dated Aug. 21, 2024.

*Primary Examiner* — Alicia Baturay
(74) *Attorney, Agent, or Firm* — Mattingly & Malur, PC

(57) ABSTRACT

Power demand at each base is adjusted so as to improve a renewable energy utilization ratio at all bases. An inter-base workload control system manages an amount of excess power obtained by subtracting a power supply amount of the renewable energy power supply from a power consumption amount associated with execution of a workload in a future time range at the bases, spatial migratable time range information on a spatial migratable time range where spatial migration of migrating the workload in a future time range at the bases to another base is possible and temporal migratable time range information on temporal migration of delaying execution of the workload in the future time range at the bases within the same base and migrating the workload to another time range and a predicted amount of power consumption through execution of the workload in the future time range at the bases.

9 Claims, 13 Drawing Sheets

(56) References Cited

U.S. PATENT DOCUMENTS

| | | | | |
|---|---|---|---|---|
| 10,048,979 B2* | 8/2018 | Vincent | ................ | G06F 9/4856 |
| 10,067,547 B2* | 9/2018 | Castro-Leon | ........... | G06F 1/266 |
| 10,185,586 B2* | 1/2019 | Kumeta | ................ | G06F 9/5094 |
| 10,776,147 B2* | 9/2020 | Ovesea | ................ | G06F 9/4856 |
| 10,852,805 B2* | 12/2020 | Magcale | ............. | G06F 11/3006 |
| 11,656,911 B2* | 5/2023 | Bahramshahry | ........ | G06F 9/505 |
| | | | | 718/103 |
| 11,823,294 B1* | 11/2023 | Kaneko | ................ | G06Q 10/04 |
| 12,099,873 B2* | 9/2024 | Grimshaw | ............ | G06F 9/4887 |
| 2004/0024861 A1* | 2/2004 | Coughlin | ............ | H04L 67/1008 |
| | | | | 709/224 |
| 2005/0034128 A1* | 2/2005 | Nagashima | ........... | G06F 9/4881 |
| | | | | 718/100 |
| 2014/0365402 A1 | 12/2014 | Belady et al. | | |
| 2016/0378532 A1 | 12/2016 | Vincent et al. | | |
| 2019/0235895 A1 | 8/2019 | Ovesea et al. | | |
| 2024/0104478 A1* | 3/2024 | Ozawa | ............. | G06Q 10/06375 |
| 2024/0155026 A1* | 5/2024 | Sreenivasan | ........ | H04L 67/1012 |
| 2024/0411594 A1* | 12/2024 | Grimshaw | ............ | G06F 9/4887 |

* cited by examiner

FIG. 4

RENEWABLE ENERGY POWER TABLE 12100

| TIME SLOT ID 12110 | CLOCK TIME 12120 | RENEWABLE ENERGY SUPPLY AMOUNT PREDICTION 12130 | RENEWABLE ENERGY SUPPLY AMOUNT ACTUAL MEASUREMENT 12140 |
|---|---|---|---|
| 01 | 2018/4/1 10:00 | 3.0 | 2.5 |
| 02 | 2018/4/1 11:00 | 5.3 | 4.0 |
| 03 | 2018/4/1 12:00 | 10.2 | 12.2 |
| 04 | 2018/4/1 13:00 | 9.1 | n/a |
| ... | ... | ... | ... |

FIG. 5

POWER DEMAND TABLE 12200

| TIME SLOT ID 12210 | CLOCK TIME 12220 | DC POWER CONSUMPTION AMOUNT PREDICTION 12230 | DC POWER CONSUMPTION AMOUNT ACTUAL MEASUREMENT 12240 | POWER CONSUMPTION TARGET VALUE 12250 |
|---|---|---|---|---|
| 01 | 2018/4/1 10:00 | 10.1 | 10.9 | 8.5 |
| 02 | 2018/4/1 11:00 | 7.8 | 6.5 | 9.0 |
| 03 | 2018/4/1 12:00 | 6.3 | 7.0 | 4.7 |
| 04 | 2018/4/1 13:00 | 9.6 | n/a | n/a |
| ... | ... | ... | ... | |

FIG. 6

WORKLOAD TABLE (12300)

| WORKLOAD ID | POWER CONSUMPTION AMOUNT PREDICTION | POWER CONSUMPTION AMOUNT ACTUAL MEASUREMENT | INPUT TIME | EXECUTION SCHEDULE | CHANGED EXECUTION SCHEDULE |
|---|---|---|---|---|---|
| 01 | 4.7 | n/a | 2018/4/1 10:05 | n/a | n/a |
| 02 | 8.2 | n/a | 2018/4/1 11:30 | n/a | n/a |
| 03 | 0.2 | 0.2 | 2018/4/1 13:40 | 2018/4/1 14:00 | n/a |
| 04 | 1.0 | n/a | 2018/4/1 14:01 | 2018/4/1 15:05 | 2018/4/1 16:01 |
| ... | ... | ... | ... | ... | ... |

(12305) (12310) (12315) (12320) (12325) (12330)

| DELAYABLE TIME | EXECUTABLE BASE | SPATIAL MIGRATABLE TIME RANGE | SPATIAL NON-MIGRATABLE TIME RANGE | EXECUTION STATUS |
|---|---|---|---|---|
| n/a | 1,2 | 0:00-7:59, 17:01-23:59 | 8:00-17:00 | BEFORE EXECUTION |
| n/a | 1,2,3,4,5 | 0:00-23:59 | n/a | EXECUTION IN PROGRESS |
| 0mins | 1 | n/a | n/a | EXECUTED |
| 480mins | 1,4,5 | n/a | n/a | EXECUTION IN PROGRESS |
| ... | ... | ... | ... | ... |

SPATIAL POWER MIGRATION TABLE

12400

12410  12420  12430

| TIME SLOT ID | CLOCK TIME | DC BASE 2 | ... | DC BASE N |
|---|---|---|---|---|
| 01 | 2018/4/1 11:00 | 4.0 | | 5.0 |
| 02 | 2018/4/1 12:00 | 0.0 | | 0.0 |
| 03 | 2018/4/1 13:00 | 1.0 | | 0.1 |
| 04 | 2018/4/1 14:00 | 2.1 | | 0.0 |
| ... | ... | ... | | |

FIG. 8

SUPPLY/DEMAND ADJUSTMENT AMOUNT RATIO TABLE　18200

| TIME SLOT ID | CLOCK TIME | DC BASE 1 | ... | DC BASE N |
|---|---|---|---|---|
| 01 | 2018/4/1 11:00 | 0.1 | | 0.2 |
| 02 | 2018/4/1 12:00 | 0.2 | | 0.5 |
| 03 | 2018/4/1 13:00 | 0.5 | | 0.1 |
| 04 | 2018/4/1 14:00 | 0.0 | | 0.7 |
| ... | ... | ... | | |

18210, 18220, 18230

WORKLOAD CONTROL EXECUTION PROCESS

DATA CENTER SYSTEM, INTER-BASE WORKLOAD CONTROL METHOD, AND INTER-BASE WORKLOAD CONTROL SYSTEM

CROSS-REFERENCE TO RELATED APPLICATION

This application is based upon and claims the benefit of priority of the prior Japanese Patent Application No. 2023-86288, filed on May 25, 2023, the entire contents of which are incorporated herein by reference.

BACKGROUND

The present invention relates to a data center system, a DC inter-base workload control method and a DC inter-base workload control system.

DESCRIPTION OF THE RELATED ART

Attention has been attracted to so-called decarbonization, which aims to move away from fossil fuels so as to prevent emissions of greenhouse gases such as carbon dioxide, which causes global warming. In this respect, many information processing apparatuses and communication equipment to execute predetermined processing loads (workloads) are set in data centers (DCs), and operating these apparatuses and equipment requires a large amount of electric power. Therefore, attempts are being made to achieve decarbonization by providing such electric power from renewable energy sources.

In this case, while it is important to keep a ratio of renewable energy to power consumption (renewable energy utilization ratio), it is preferable to keep this renewable energy utilization ratio in order to achieve cleaner DCs with finer time granularity (e.g., hourly rather than daily).

Another problem is that supplies of renewable energy depend on factors such as weather, and so energy supplies are quite unstable, and as the dependency on renewable energy increases, power providers need to be provided with more coordinating power (power necessary to match demand and supply of electricity) so that the power providers perform stable power supplies, and this constitutes a burden on the power providers.

Therefore, there are attempts to control power consumed at DCs by temporally controlling workloads executed at DCs or by spatially controlling the workloads between a plurality of DC bases (collection of DCs within the same area) to control power consumed at DCs and thereby improve the renewable energy utilization ratio or utilize the DCs as coordinating power for the power system.

Here, "temporally controlling a workload" refers to such control that a workload is temporarily delayed in execution within the same DC base. In this way, by delaying many workloads from a time range where renewable energy supply is insufficient to a time range where renewable energy supply is surplus, it is possible to increase the renewable energy utilization ratio.

On the other hand, "spatially controlling a workload" refers to such control that a location where a workload is executed is moved from a certain DC base to another DC base. In this way, as in the case of temporal control, by moving the workload from a DC base where renewable energy supply is insufficient to another DC base where renewable energy supply is abundant, it is possible to increase the renewable energy utilization ratio.

Generally, workloads executed at DC bases can be broadly divided into two types: interactive workload and batch job. An interactive workload is one such as a Web application that needs to be processed in real time and is basically always in a running condition. A batch job is one such as image processing or machine learning training process that does not necessarily need to be processed immediately, and may be executed by a predetermined time and processing thereof can be delayed within such a range.

Although the interactive workload here can be spatially controlled, processing of the interactive workload cannot be delayed, and therefore the interactive workload is not suitable for temporal control. On the other hand, processing of a batch job can be delayed, and so it can be temporally controlled. Thus, for clarity, the former will be referred to as a "spatial-migration-oriented workload" and the latter will be referred to as a "temporal-migration-oriented workload."

Japanese Patent Laid-Open No. 2021-189845 discloses a technology to efficiently utilize renewable energy generated at DC bases by migrating workload execution process from a DC base where renewable energy supply is predicted to be insufficient to a DC base where renewable energy supply is predicted to be surplus.

Using the technology in Japanese Patent Laid-Open No. 2021-189845 makes it possible to perform spatial control of workloads according to renewable energy supply at the DC bases and adjust the ratio of workloads executed at the DC bases. This allows the renewable energy utilization ratio to be improved at the DC bases.

However, workloads executed at the DC bases cannot always migrate between the DC bases freely. When workloads migrate between the DC bases, downtimes may be produced on no small number of workloads, and so users who execute the workloads may limit time ranges in which the workloads can migrate between the DC bases. For example when a workload is something like a Web application, trouble may occur if a downtime is produced in a time range frequently accessed by users, and so spatial migration of such workloads may be set to be non-migratable. In such a time range, since it is not possible to spatially control workloads, DC power demand may not be adjustable.

An object of the present invention, which has been made in view of such backgrounds, is to provide a data center system, a DC inter-base workload control method and a DC inter-base workload control system that can perform spatial control of workloads between DC bases and temporal control within a DC base while taking into account time ranges in which no workload is migratable to thereby adjust DC power demand so as to improve the renewable energy utilization ratio at all the DC bases.

SUMMARY

As an aspect of solving the above-described problems, the invention provides a data center system including a plurality of bases provided with a calculation resource and a renewable energy power supply to execute a workload, and an inter-base workload control system to control migration of the workload between the plurality of bases and within a same base, in which a processor of the inter-base workload control system manages a positive excess power amount obtained by subtracting a predicted amount of power supply of the renewable energy power supply from a predicted amount of power consumption of the calculation resource associated with execution of the workload in a future time range at the bases, spatial migratable time range information on a spatial migratable time range where spatial migration is possible and the workload scheduled to be executed in the future time range at the bases can be migrated to another base and a non-migratable time range where such migration is not possible, temporal migratable time range information on temporal migration whereby the workload scheduled to be executed in the future time range at the bases is delayed in execution within the same base to be migrated to another time range and a predicted amount of power consumption which is a predicted amount of power consumption of the calculation resource associated with execution of the workload scheduled to be executed in the future time range at the bases, determines a power adjustment amount indicating the predicted amount of power consumption that moves through the spatial migration and the temporal migration of the workload scheduled to be executed in the future time range at the bases based on the spatial migratable time range information, the temporal migratable time range information and the predicted amount of power consumption so that a sum total of the excess power amounts in the future time range at the plurality of bases becomes smaller, and executes the spatial migration and the temporal migration of the workload based on the power adjustment amount.

According to the present invention, it is possible to perform spatial control of workloads between DC bases and temporal control within a DC base while taking into account a workload non-migratable time range to thereby adjust DC power demand so as to improve a renewable energy utilization ratio at all DC bases.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF DRAWINGS

FIG. 4 is a diagram illustrating an example of a renewable energy power table;

FIG. 5 is a diagram illustrating an example of a power demand table;

FIG. 6 is a diagram illustrating an example of a workload table;

FIG. 7 is a diagram illustrating an example of a spatial power migration table;

FIG. 8 is a diagram illustrating an example of a supply/demand adjustment amount ratio table;

DESCRIPTION OF EMBODIMENTS

Figure 1:
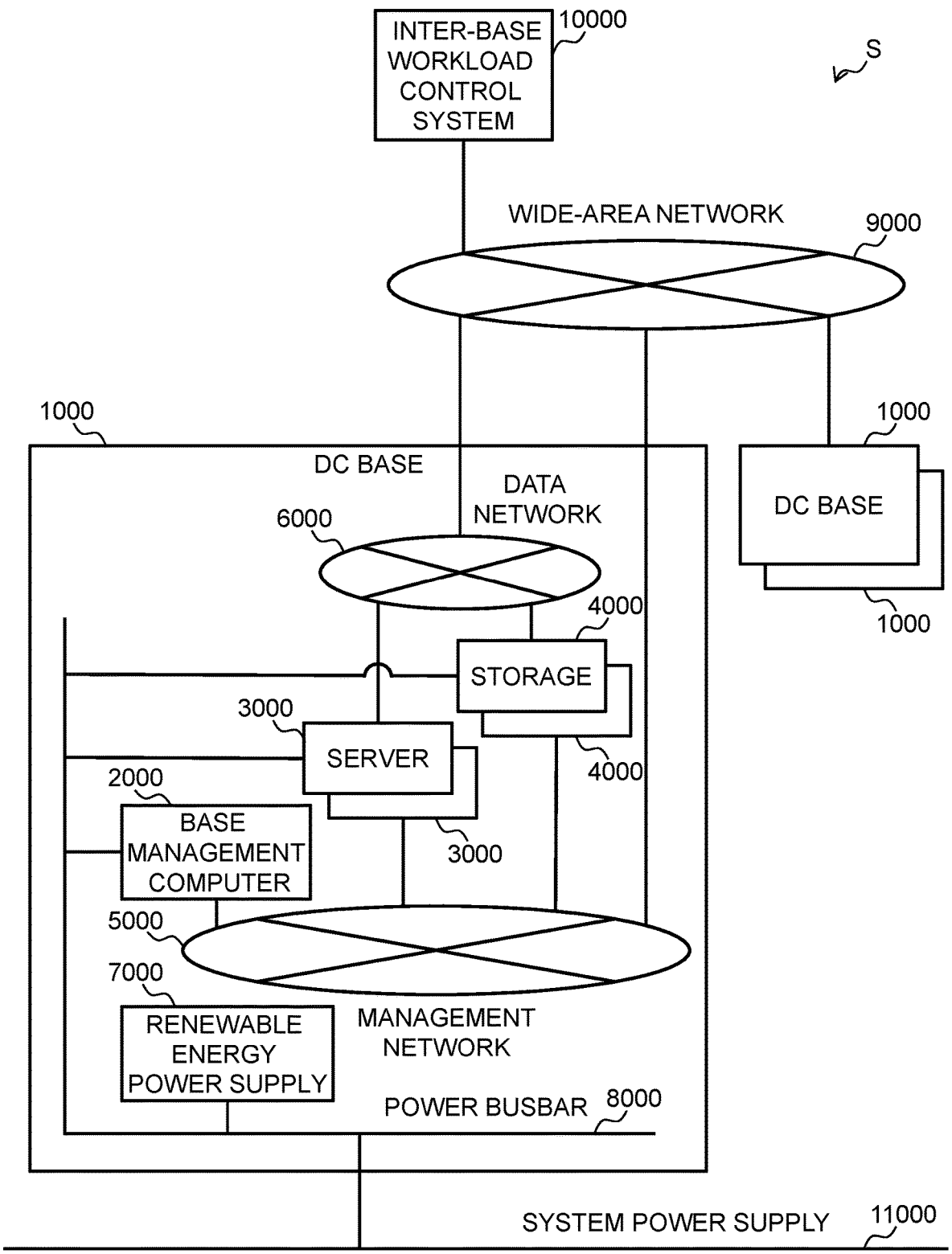
FIG. 1 is a diagram illustrating an example of a configuration of a data center system according to the present embodiment.

Hereinafter, embodiments of the present invention will be described in detail based on the accompanying drawings. The present embodiments are just an example of how to implement the present invention and are not limiting the technical scope of the present invention. Various elements described in the present embodiments and a combination of all those elements are not necessarily essential to the means for providing solutions to the problems of the invention.

In the following descriptions, identical reference numerals are assigned to identical components in principle and repetitive descriptions are omitted. The number of respective components in the following descriptions are not limited unless otherwise noted. In the following descriptions, when identical components are described in a distinct manner, reference numerals including subscripts are used, whereas when identical components are described without distinction, reference numerals excluding the subscripts are used.

In the following descriptions, there are cases where processes executed by a program may be described. A computer performs processes defined by the program using a processor (e.g., CPU (Central Processing Unit), GPU (Graphics Processing Unit)) while using a memory of a main storage apparatus or the like. Therefore, the entity of processes performed by executing the program may be regarded as the processor. By the processor executing the program, functional parts that perform the processes are implemented.

Similarly, the entity of processes performed by executing the program may be a controller, an apparatus, a system, a computer or a node, each having a processor. The entity of processes performed by executing the program needs only to be a computation section or may include a dedicated circuit that performs specific processing. Examples of the dedicated circuit include FPGA (Field-Programmable Gate Array) and ASIC (Application Specific Integrated Circuit).

In the following descriptions, the program may be installed in the computer from a program source. The program source may be, for example, a program distribution server or computer-readable non-transitory storage media. In the case where the program source is a program distribution server, the program distribution server includes a processor and a storage resource (storage) that stores programs to be distributed and the processor of the program distribution server may distribute the programs to be distributed to other computers. Moreover, in the present embodiments, two or more programs may be implemented as one program or one program may be implemented as two or more programs.

In the following descriptions, various kinds of data will be described in table formats. However, the data formats are not limited to table formats, but may be other data formats such as a cue, a list or a CSV (Comma Separated Value).

In the following descriptions, IDs (identifiers), numbers or the like are used as information to identify some targets, but without being limited to them, identification information of various kinds may be used.

FIG. 1 is a diagram illustrating an example of a configuration of a data center system S according to the present embodiment.

The data center system S is composed of one or a plurality of DC (Data Center) bases 1000 and an inter-base workload control system 10000. The DC bases 1000 are communicatively coupled by a wide area network 9000.

The DC base 1000 is provided with a base management computer 2000, one or a plurality of servers 3000 used by an administrator or a user of the DC base 1000 and one or a plurality of storages 4000 used by the administrator or the user of the DC base 1000. The servers 3000 and the storages 4000 are communicatively coupled by a data network 6000. Furthermore, the base management computer 2000, the servers 3000 and the storages 4000 are communicatively coupled by a management network 5000.

Note that the management network 5000, the data network 6000 and the wide area network 9000 are wired or wireless communication networks such as internet, LAN (Local Area Network), WAN (Wide Area Network) or dedicated line.

The power for driving the base management computer 2000, the servers 3000 and the storages 4000 is supplied from a power busbar 8000 within the DC bases 1000 and can be supplied by a renewable power supply 7000 within the DC base 1000 or a system power supply 11000 from outside. The renewable power supply 7000 is power generation equipment of renewable energy such as sunlight, wind power installed in the DC bases 1000 and the power generated within the DC base 1000 can be used within the DC base 1000.

The servers 3000 and the storages 4000 execute various kinds of processing such as the aforementioned spatial-migration-oriented workload or temporal-migration-oriented workload.

The inter-base workload control system 10000 allocates a processing load (workload) for the system, execution of which is instructed by the user to each DC base 1000. The inter-base workload control system 10000 also causes a workload already executed at a DC base to migrate to another DC base as appropriate.

The base management computer 2000 manages workloads allocated by the inter-base workload control system 10000 to each DC base 1000 in predetermined time intervals (time slots) and controls timing at which the workload is executed within each DC base.

Note that in the present embodiments, a workload may refer to a job (process) itself. In the following descriptions, the interval of a time slot is supposed to be one hour, but the time slot interval is not limited to such an interval, and any given time interval can be set.

Figure 2:
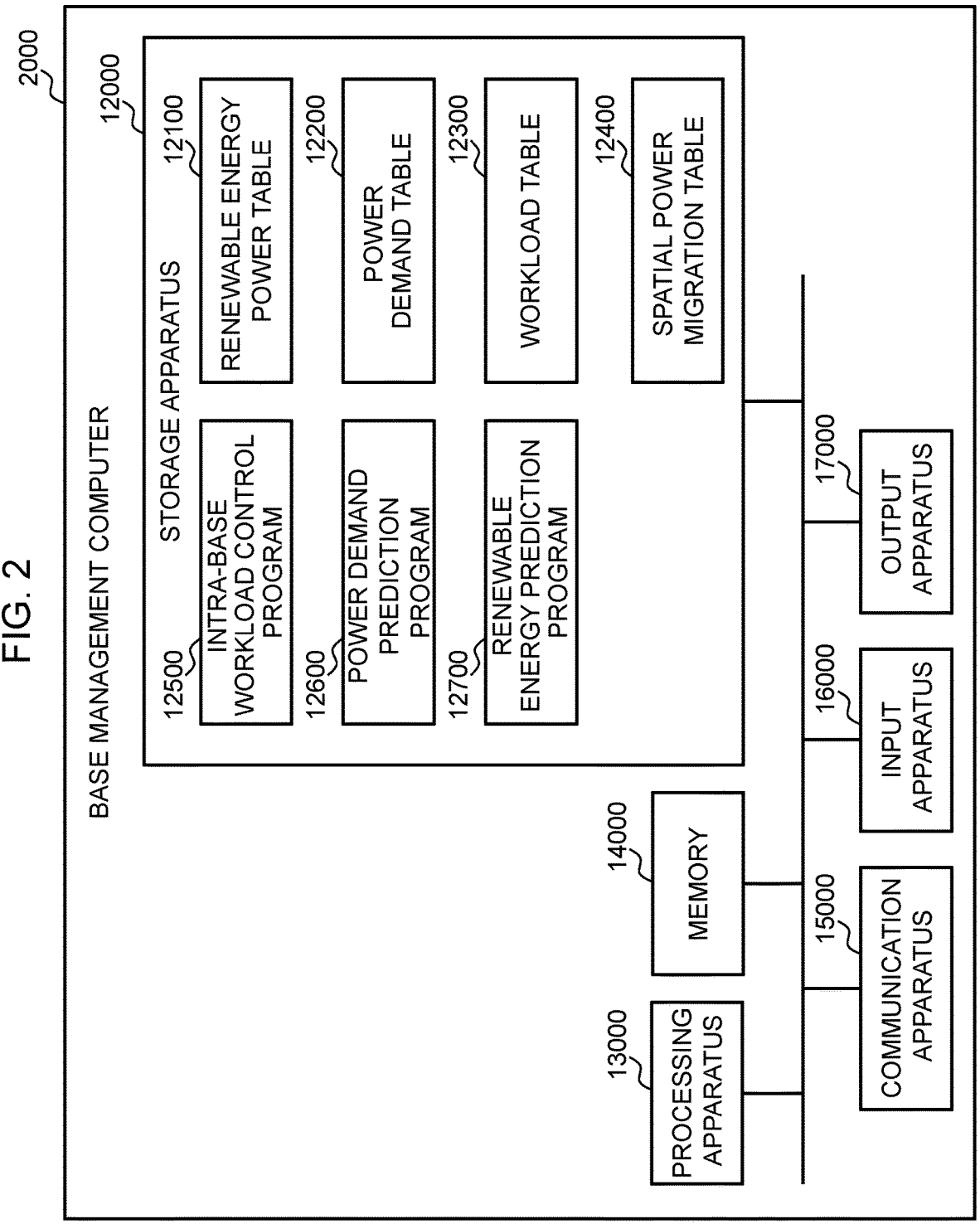
FIG. 2 is a diagram illustrating an example of a configuration of a base management computer.

FIG. 2 is a diagram illustrating an example of a configuration of the base management computer 2000.

The base management computer 2000 is provided with a storage apparatus 12000 such as an HDD (Hard Disk Drive) or an SSD (Solid State Drive). The base management computer 2000 is provided with a processing apparatus 13000 (processor) such as a CPU (Central Processing Unit), a DSP (Digital Signal Processor), a GPU (Graphics Processing Unit) or an FPGA. The base management computer 2000 is provided with a main storage apparatus 14000 (memory) such as a ROM (Read Only Memory) or a RAM (Random Access Memory). The base management computer 2000 is provided with a communication apparatus 15000 composed of a NIC (Network Interface Card), a wireless communication module, a USB (Universal Serial Bus) (registered trademark, the same applies hereafter) module or a serial communication module. The base management computer 2000 is provided with an input apparatus 16000 composed of a mouse and a keyboard or the like and an output apparatus 17000 composed of a liquid crystal display, an organic EL (Electro-Luminescence) display or the like.

The base management computer 2000 stores various programs such as an intra-base workload control program 12500, a power demand prediction program 12600 and a renewable energy prediction program 12700.

The intra-base workload control program 12500 calculates a target amount of power consumption in a future time slot so as to maximize a renewable energy utilization ratio based on a predicted amount of power consumption in the future time slot at the DC base 1000. Based on the determined target amount of power consumption, the intra-base workload control program 12500 determines execution timing of each workload in the future time slot and executes each workload at the determined timing.

The power demand prediction program 12600 calculates a predicted amount of power consumed at the DC base 1000 in the future time slot.

The renewable energy prediction program 12700 calculates a predicted amount of renewable energy power supplied to the DC base 1000 in the future time slot. The renewable energy supplied to the DC base 1000 may be generated by the renewable power supply 7000 or may be supplied according to a PPA (Power Purchase Agreement) or the like.

Furthermore, the base management computer 2000 stores respective databases of a renewable energy power table 12100, a power demand table 12200, a workload table 12300 and a spatial power migration table 12400.

The renewable energy power table 12100 stores a predicted amount of renewable energy to be supplied, predicted by the renewable energy prediction program 12700 in each time slot and its actual value.

The power demand table 12200 stores a predicted amount and an actual amount of power consumed at the DC bases 1000 in each time slot and a power consumption target amount.

The workload table 12300 stores and accumulates predicted values and actual values of power consumption of workloads executed at the respective DC bases 1000 and information on execution schedules, spatial migratable time and spatial non-migratable time. The servers 3000 and the storages 4000 execute each workload according to the workload table 12300.

The spatial power migration table 12400 stores information on an amount of power of a spatial-migration-oriented workload to be relocated from a certain DC base 1000 to another DC base 1000 in each time slot.

Figure 3:
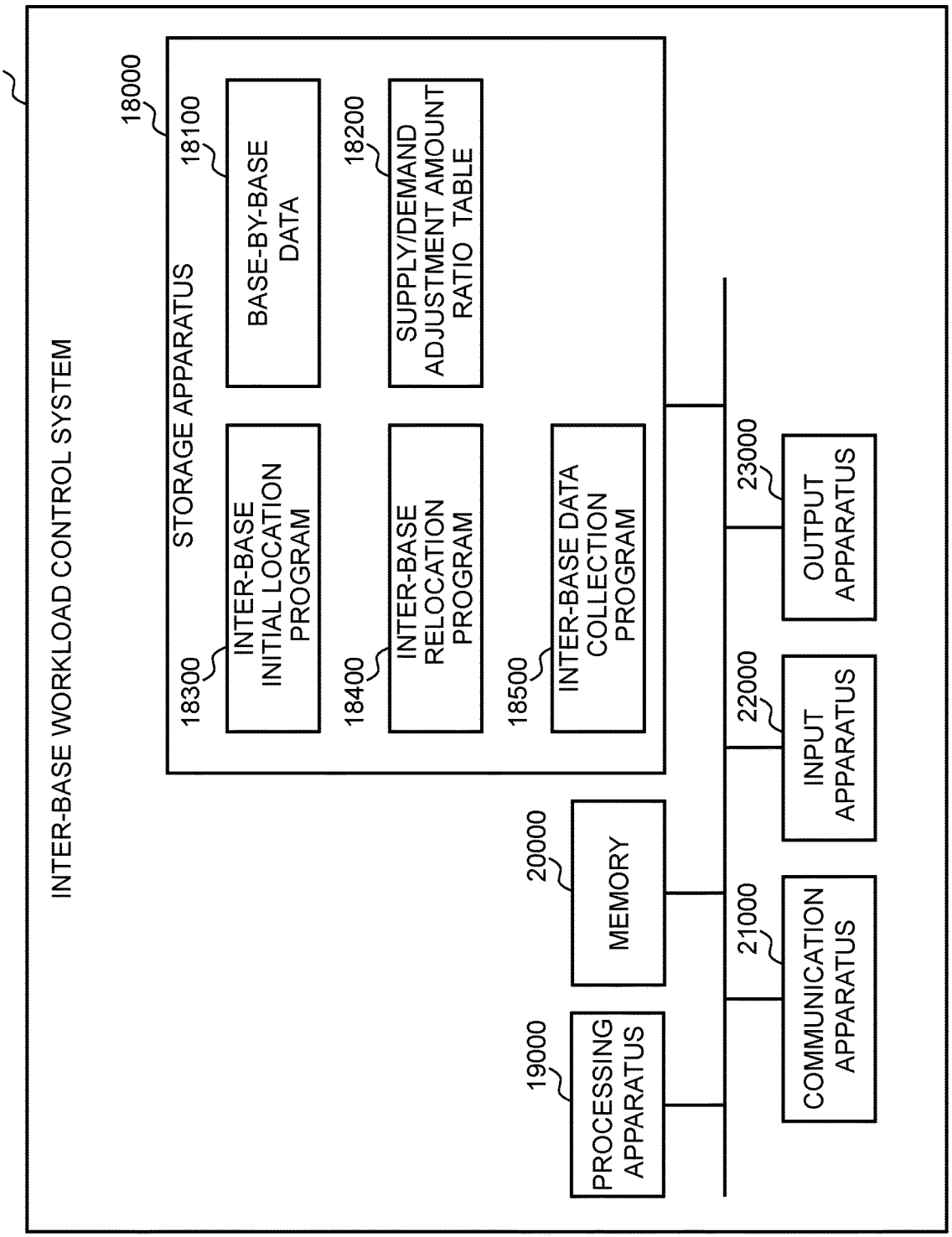
FIG. 3 is a diagram illustrating an example of a configuration of an inter-base workload control system.

FIG. 3 is a diagram illustrating an example of a configuration of the inter-base workload control system 10000.

The inter-base workload control system 10000 is provided with a storage apparatus 18000 such as an HDD, an SSD, a processing apparatus 19000 (processor) such as a CPU, a DSP, a GPU or an FPGA and a main storage apparatus 20000 (memory) such as a ROM or a RAM. The inter-base workload control system 10000 is provided with a communication apparatus 21000 composed of a NIC, a wireless communication module, a USB module, a serial communication module or the like. The inter-base workload control system 10000 is provided with an input apparatus 22000 composed of a mouse, a keyboard or the like and an output apparatus 23000 composed of a liquid crystal display, an organic EL display or the like.

The inter-base workload control system 10000 stores respective programs of an inter-base initial location program 18300, an inter-base relocation program 18400 and an inter-base data collection program 18500.

The inter-base initial location program 18300 calculates a ratio at which initial location of a workload should be performed at the DC bases in a future time slot based on an amount of renewable energy to be supplied and power demand in the future time slot at the DC bases 1000. The inter-base initial location program 18300 then performs control to allocate a workload to each DC base 1000 based on the calculated ratio at the clock time.

The inter-base relocation program 18400 determines what amount of power of a spatial-migration-oriented workload already executed at a certain DC base should be relocated to another DC base in the future time slot. This amount of power is determined based on information on an amount of renewable energy to be supplied, power demand, a spatial migratable time range and a spatial non-migratable time range in the future time slot at the DC bases 1000. The inter-base relocation program 18400 then performs workload relocation at the clock time in the future time slot.

The inter-base data collection program 18500 collects information on the power demand and the amount of renewable energy to be supplied, predicted by the power demand prediction program 12600 and the renewable energy prediction program 12700 respectively, at the DC bases 1000.

Furthermore, the inter-base workload control system 10000 stores respective databases of a base-by-base data 18100 and a supply/demand adjustment amount ratio table 18200.

The base-by-base data 18100 stores information on the power demand and the amount of renewable energy to be supplied or the like, collected from each DC base.

The supply/demand adjustment amount ratio table 18200 stores a supply/demand adjustment amount ratio that indicates at which DC base and in what ratio workloads should be initially located in each time slot.

Next, specific examples of the respective databases will be described.

(Renewable Energy Power Table)

FIG. 4 is a diagram illustrating an example of the renewable energy power table 12100 for each DC base 1000. The renewable energy power table 12100 includes data items of a time slot ID 12110 in which information on time slot identification is set and clock time 12120 in which the time slot start clock time is set. The renewable energy power table 12100 includes data items of a renewable energy supply amount prediction 12130 in which a predicted amount of renewable energy to be supplied at the target clock time is set. The renewable energy power table 12100 includes data items of a renewable energy supply amount actual measurement 12140 in which a measured amount of renewable energy to be supplied, actually measured at the target clock time is set. The renewable energy power table 12100 is composed of one or more records having these data items.

The renewable energy supply amount prediction 12130 includes an amount of power supplied from a renewable energy power supply (renewable power supply 7000) in the future time range (time slot) at the DC bases 1000 and a predicted amount of power supplied or purchased from outside according to the PPA or the like.

Note that each predicted value and measured value in the renewable energy power table 12100 may be inputted by the user or automatically acquired from a predetermined database.

(Power Demand Table)

FIG. 5 is a diagram illustrating an example of the power demand table 12200 for each DC base 1000. The power demand table 12200 includes data items of a time slot ID 12210 in which time slot identification information is set and clock time 12220 in which the time slot start clock time is set. The power demand table 12200 includes data items of a DC power consumption amount prediction 12230 in which a predicted amount of power consumption at the DC base 1000 at the target clock time is set. The power demand table 12200 includes data items of a DC power consumption amount actual measurement 12240 in which a measured amount of power consumption at the DC base 1000 actually measured at the target clock time is set. The power demand table 12200 includes data items of a power consumption target value 12250 indicating a target amount of power when the intra-base workload control program 12500 actually deploys a workload at the target clock time. The power demand table 12200 is composed of one or more records having these data items.

The DC power consumption amount prediction 12230 is a predicted amount of power consumption including a calculation resource (server 3000, storage 4000) associated with workload execution in a future time range (time slot) at the DC bases 1000 and network equipment (not shown), air conditioning or the like.

Note that the respective predicted values and measured values in the power demand table 12200 may be inputted by the user or may be automatically acquired from a predetermined database.

(Workload Table)

FIG. 6 is a diagram illustrating an example of the workload table 12300. The workload table describes information on workloads allocated through the inter-base workload control system 10000 at the DC bases 1000. The workload table 12300 includes data items of a workload ID 12305 in which workload identification information is set and a power consumption amount prediction 12310 in which a predicted amount of power consumption in a workload is set. The workload table 12300 includes data items of a power consumption amount actual measurement 12315 in which a measured amount of power consumption in a workload is set and input time 12320 in which the time at which workload information is inputted to the base management computer 2000 is set. Furthermore, in the case of a temporal-migration-oriented workload, the workload table 12300 includes data items of an execution schedule 12325 representing the clock time at which workload execution may be started. The workload table 12300 includes data items of a changed execution schedule 12330 in which execution timing changed (delayed) by the intra-base workload control program 12500 from the execution schedule 12325 regarding the workload is set. The workload table 12300 includes data items of a delayable time 12335 representing the delayable time when the workload is a temporal-migration-oriented workload and an executable base 12340 in which the DC base 1000 that can execute a workload is set. Regarding a temporal-migration-oriented workload, when the delayable time 12335 is 0 or when the intra-base workload control program 12500 determines that there is no need for the delay, the changed execution schedule 12330 becomes n/a, and the workload is executed at the clock time according to the execution schedule 12325. When enough time is set as the delayable time 12335 and when the intra-base workload control program 12500 determines that the workload will be delayed, the clock time is written in the changed execution schedule 12330 and the workload is executed at that clock time. The workload table 12300 includes data items of the spatial migratable time range 12345 in which a spatial migratable time range is set when the workload is a spatial-migration-oriented workload. The workload table 12300 includes data items of the spatial non-migratable time range 12350 in which a spatial non-migratable time range is set when the workload is a spatial-migration-oriented workload. The workload table 12300 includes data items of an execution status 12355 in which a workload execution status is set.

The workload table 12300 is composed of one or more records having these data items.

The delayable time 12335 is temporal migratable time information on temporal migration whereby a workload scheduled to be executed in a future time range (time slot) at the DC bases is delayed in execution within the same DC base 1000 and migrated to another time range (time slot).

The spatial migratable time range 12345 is information on a spatial migratable time range where a workload scheduled to be executed in a future time range (time slot) at a DC base 1000 is migrated to another DC base 1000. The spatial non-migratable time range 12350 is information on a non-migratable time range where it is not possible to migrate a workload scheduled to be executed in a future time range (time slot) at a DC base 1000 to another DC base 1000. The spatial migratable time range 12345 and the spatial non-migratable time range 12350 are information on the spatial migratable time range.

In the case of a temporal-migration-oriented workload, the user inputs the workload after writing the execution schedule 12325, the delayable time 12335 representing maximum time by which workload execution can be delayed from the execution schedule 12325 and the executable base 12340. In the case of a spatial-migration-oriented workload, the user inputs the workload after writing the spatial migratable time range 12345 and the spatial non-migratable time range 12350. In the case of the spatial-migration-oriented workload, the workload is executed immediately at the clock time the workload is inputted, and so no information is held on the execution schedule 12325 and the delayable time 12335.

(Spatial Power Migration Table)

FIG. 7 is a diagram illustrating an example of the spatial power migration table 12400. The spatial power migration table 12400 includes data items of a time slot ID 12410 in which time slot identification information is set and clock time 12420 in which the time slot start clock time is set. The spatial power migration table 12400 includes data items of a DC base (N) 12430 representing a power amount of spatial-migration-oriented workload to be relocated to a DC base 1000 other than the own base at the target clock time. The spatial power migration table 12400 is composed of one or more records having these data items.

The number of columns saved in the DC base (N) 12430 is equal to the number of other DC bases 1000 except the DC base 1000 itself in which this table is saved. For example, if the number of DC bases 1000 is assumed to be M, the number of columns saved in the DC base (N) 12430 is M−1.

(Supply/Demand Adjustment Amount Ratio Table)

FIG. 8 is a diagram illustrating an example of the supply/demand adjustment amount ratio table 18200. The supply/demand adjustment amount ratio table 18200 includes data items of a time slot ID 18210 in which time slot identification information is set and clock time 18220 in which the time slot start clock time is set. The supply/demand adjustment amount ratio table 18200 includes data items of a DC base (N) 18230 representing at what ratio workloads inputted to the inter-base workload control system 10000 are allocated to the respective DC bases 1000 at the target clock time. The supply/demand adjustment amount ratio table 18200 is composed of one or more records having these data items.

The number of columns saved in the DC base (N) 18230 is equal to the number of DC bases 1000. For example, if the number of DC bases 1000 is assumed to be M, the number of columns saved in the DC base (N) 18230 is M.

If the above-described programs are executed by the base management computer 2000, the programs are executed by the processing apparatus 13000 reading (the programs stored in the main storage apparatus 14000 or the storage apparatus 12000). Similarly, if the programs are executed by the inter-base workload control system 10000, the programs are executed by the processing apparatus 19000 reading (the program stored in the main storage apparatus 20000 or the storage apparatus 18000). Each program can be recorded in a recording medium and distributed.

Note that all or part of the base management computer 2000 and the inter-base workload control system 10000 may be implemented using virtual information processing resources supplied using a virtualization technology or a process space separation technology or the like. It can be, for example, a virtual server supplied by a cloud system. All or part of functions provided by the base management computer 2000 and the inter-base workload control system 10000 may be implemented by a service provided by a cloud system via an API (Application Programming Interface).

Next, processes executed by the base management computer 2000 and the inter-base workload control system 10000 will be described.

<Workload Control Planning Process>

Figure 9:
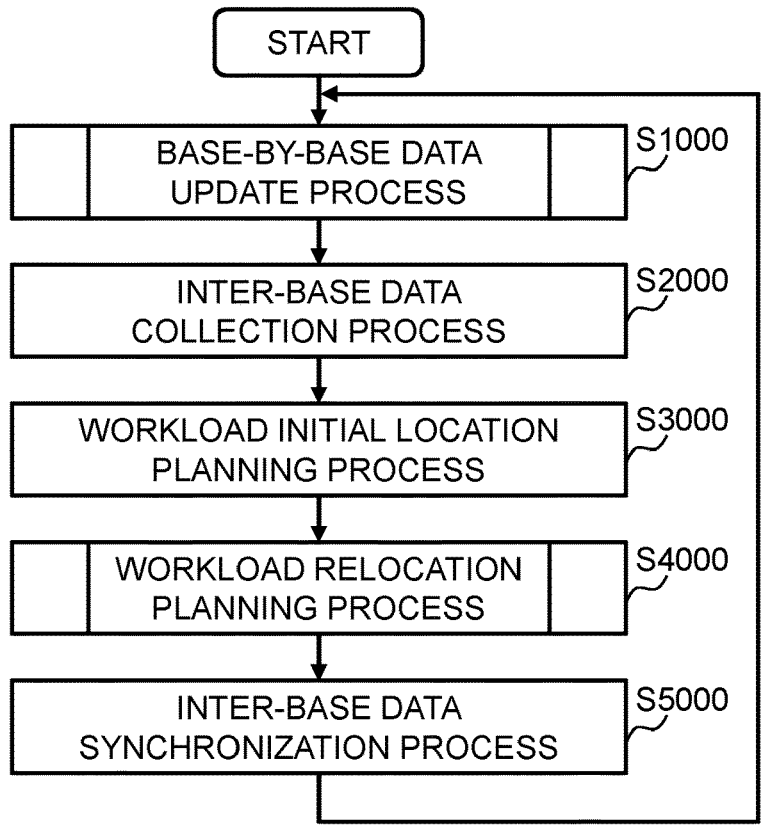
FIG. 9 is a flowchart describing an overview of a workload control planning process.

FIG. 9 is a flowchart describing an overview of a workload control planning process, which is a process of planning in advance how the DC base 1000 controls a workload in a future time slot. The workload control is executed by repeating the workload control planning process (FIG. 9) and a workload control execution process (FIG. 11), which will be described later.

First of all, the workload control planning process is repetitively executed in a preliminary stage of actually controlling a workload every predetermined clock time (e.g., daily), at a predetermined time interval (e.g., predetermined hours and minutes before each time slot starts) or at predetermined timing (user-specified clock time). For example, in a stage of the day before actually controlling a workload, how to control the workload on the next day is planned. However, at the stage of the day before, it is impossible to exactly know what kind of workload is inputted on the day of control. Therefore, instead of making a control plan about individual workloads, a rough policy can be made about how to control an approximate amount of power or a ratio of the amount of power predicted to be consumed by the workload in each future time slot. The "control" is temporal migration or spatial migration.

The inter-base workload control system 10000 plans a supply/demand adjustment amount ratio indicating the ratio of how much of the inputted workload should be allocated in each future time slot. A plan is made as to what amount of power consumed by a spatial-control-oriented workload already executed at a certain DC base 1000 should be migrated to another DC base 1000.

The base management computer 2000 plans how to temporally control the power consumed by the temporal-migration-oriented workload within the DC base 1000 in each future time slot.

After that, in the workload control execution process, individual workload control is performed based on spatial control and temporal control policies (what amount of power should be temporally or spatially migrated) actually planned in the workload control planning process at the clock time in the time slot.

First in step S1000, the base management computer 2000 executes a base-by-base data update process of predicting an amount of renewable energy to be supplied at the DC bases 1000 and an amount of DC power consumption and accumulating these past data. Details of the base-by-base data update process (S1000) will be described later.

Next, in step S2000, the inter-base data collection program 18500 in the inter-base workload control system 10000 collects update data and stores the update data in the base-by-base data 18100. The update data is the amount of renewable energy to be supplied at all the DC bases 1000 updated in step S1000, the predicted amount of DC power consumption and the actual amount.

Next, in step S3000, the inter-base initial location program 18300 in the inter-base workload control system 10000 calculates a supply/demand adjustment amount ratio in the future time slot based on information on each DC base 1000 collected in step S2000. The supply/demand adjustment amount ratio is stored at the DC base (N) 18230 in the supply/demand adjustment amount ratio table 18200. As described, for example, in Japanese Patent Laid-Open No. 2021-189845, the method for calculating the supply/demand adjustment amount ratio may be calculated based on a supply/demand balance between the amount of renewable energy to be supplied and the amount of power consumption at the DC bases 1000 or using other methods.

At the DC bases 1000, the base management computer 2000 calculates a target amount of power consumption in the future time slot based on the supply/demand adjustment amount ratio, the amount of renewable energy to be supplied at the base and the predicted amount of DC power consumption determined by the inter-base workload control system 10000. The target amount of power consumption is stored in the power consumption target value 12250 in the power demand table 12200. Any given method may be used as the method for calculating the target amount of power consumption as long as it is a method for determining an amount of power that improves the renewable energy utilization ratio.

Next, in step S4000, the inter-base relocation program 18400 of the inter-base workload control system 10000 executes a workload relocation planning process. In the workload relocation planning process, each DC base 1000 in the future time slot makes a plan of relocating an already executed workload at another DC base 1000. Details of the workload relocation planning process (S4000) will be described later.

Next, in step S5000, a control parameter of each DC base 1000 updated by the inter-base workload control system 10000 in step S4000 is synchronized with that of each DC base 1000. The above-described processes are repetitively executed.

<Base-by-Base Data Update Process>

Figure 10:
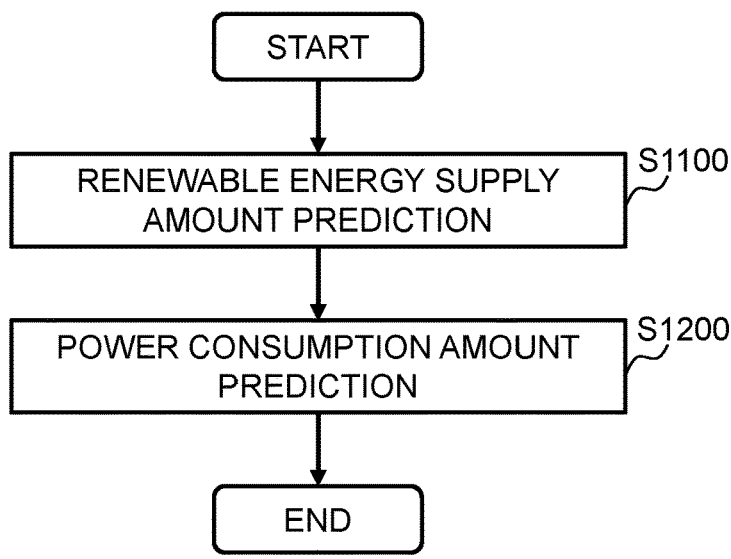
FIG. 10 is a flowchart describing details of a base-by-base data update process.

Next, details of a base-by-base data update process (S1000) will be described. FIG. 10 is a flowchart describing the base-by-base data update process (S1000). This process is executed at all the DC bases 1000.

First, in step S1100, the renewable energy prediction program 12700 predicts an amount of renewable energy to be supplied in respective time slots after the present. More specifically, for example, the renewable energy prediction program 12700 acquires each value of the clock time 12120 corresponding to each record of the renewable energy power table 12100 and each value of the renewable energy supply amount actual measurement 12140. The renewable energy prediction program 12700 predicts an amount of renewable energy to be supplied in a time slot after the present based on a predetermined algorithm (e.g., by executing a time sequence analysis or creating a prediction model through machine learning or the like) for the acquired values. The renewable energy prediction program 12700 stores each predicted amount of supply in the renewable energy supply amount prediction 12130 of each time slot record of the renewable energy power table 12100.

Note that the data used by the renewable energy prediction program 12700 to predict an amount of renewable energy to be supplied is not limited to the measured value of renewable energy supplied as shown here. In other words, the data may be used in combination with other information such as meteorological data at the DC base 1000.

The renewable energy prediction program 12700 acquires amounts of renewable energy supplied in past time slots from a predetermined apparatus (e.g., from an external database or server). The renewable energy prediction program 12700 stores the acquired amount of renewable energy supplied in the renewable energy supply amount actual measurement 12140 of records associated with the time slots of the renewable energy power table 12100 as actual values.

Next, in step S1200, the power demand prediction program 12600 predicts an amount of power consumption in each time slot after the present. More specifically, for example, the power demand prediction program 12600 acquires the respective values of the respective records at the clock time 12220 and the DC power consumption amount actual measurement 12240 in the power demand table 12200. The power demand prediction program 12600 predicts an amount of power consumption for all the DC bases based on a predetermined algorithm (e.g., by executing a time sequence analysis or creating a prediction model through machine learning) in each time slot after the present for the acquired value. The power demand prediction program 12600 stores the respective predicted amounts of power consumption in the DC power consumption amount prediction 12230 of each time slot record in the power demand table 12200.

Note that the data used by the power demand prediction program 12600 for prediction of the amount of power consumption is not limited to the measured values of power consumption shown here, but the data may be used in combination with other information such as meteorological data in the DC base 1000.

The power demand prediction program 12600 acquires an amount of power consumption of the entire DC base at the DC base 1000 in a past time slot from predetermined apparatuses (e.g., external databases or servers). The power demand prediction program 12600 stores the acquired amount of power consumption in the DC power consumption amount actual measurement 12240 of a record associated with the time slot in the power demand table 12200 as an actual value.

<Workload Control Execution Process>

The workload control execution process is a process of determining at which DC base 1000 and when individual workloads should be executed based on the control policies in each time slot planned in the workload control planning process. The workload control execution process is composed of two processes: a workload initial location control process and a workload relocation control process. The workload initial location control process is a control process for a workload before execution and the workload relocation control process is a control process for a workload already executed at any DC base 1000.

Figure 11:
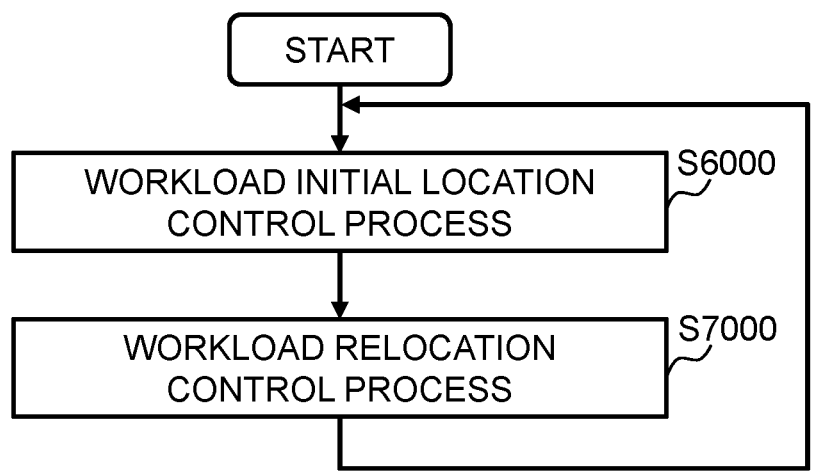
FIG. 11 is a flowchart describing a workload control execution process.

FIG. 11 is a flowchart describing the workload control execution process.

First, in step S6000, the inter-base initial location program 18300 and the intra-base workload control program 12500 perform the workload initial location control process.

When there is a workload that the user wants to execute at any one of the DC bases 1000, the user provides an instruction for inputting a workload to the inter-base workload control system 10000. At this time, the user specifies the DC base 1000 that is allowed to execute the workload by taking into account characteristics of the workload scheduled to be executed. For example, since only the DC bases 1 and 2 satisfy an SLA (Service Level Agreement) such as latency, the user may allow locations at the DC bases 1 and 2, but the user may not allow locations at the other DC bases 1000. When the workload is a temporal-migration-oriented workload, the user specifies information about how much delay from input to execution is allowed.

The inter-base initial location program 18300 determines at which DC base 1000 to locate the workload based on the supply/demand adjustment amount ratio 18230 calculated in step S3000 of the workload control planning process and the information on at which DC base 1000 the workload can be located.

The workload allocated to any one DC base 1000 by the inter-base initial location program 18300 is immediately executed if it is a spatial-control-oriented workload. If it is a temporal-control-oriented workload, the intra-base workload control program 12500 determines the appropriate execution time for the temporal-control-oriented workload based on the power consumption amount prediction 12310 of the workload and stores the appropriate execution clock time in the changed execution schedule 12330. In such a case, considering the information of the delayable time 12335, the program ensures that the power consumption amount in each time slot is as close to the power consumption target value 12250 as possible. After that, when the clock time set in the changed execution schedule 12330 comes, the program executes the workload.

The location control of the DC base 1000 performed by the inter-base initial location program 18300 and the temporal control performed by the intra-base workload control program 12500 together are called a "workload initial location control process."

Next, in step S7000, the inter-base relocation program 18400 executes a workload relocation control process. The inter-base relocation program 18400 determines a workload to migrate to each DC base 1000 based on the power consumption amount prediction 12310 of the workload ensuring that the amount of power is as close to the amount of power stored at the DC base (N) 12430 in the spatial power migration table 12400 as possible. Then, the inter-base relocation program 18400 executes actual migration.

<Workload Relocation Planning Process>

Figure 12:
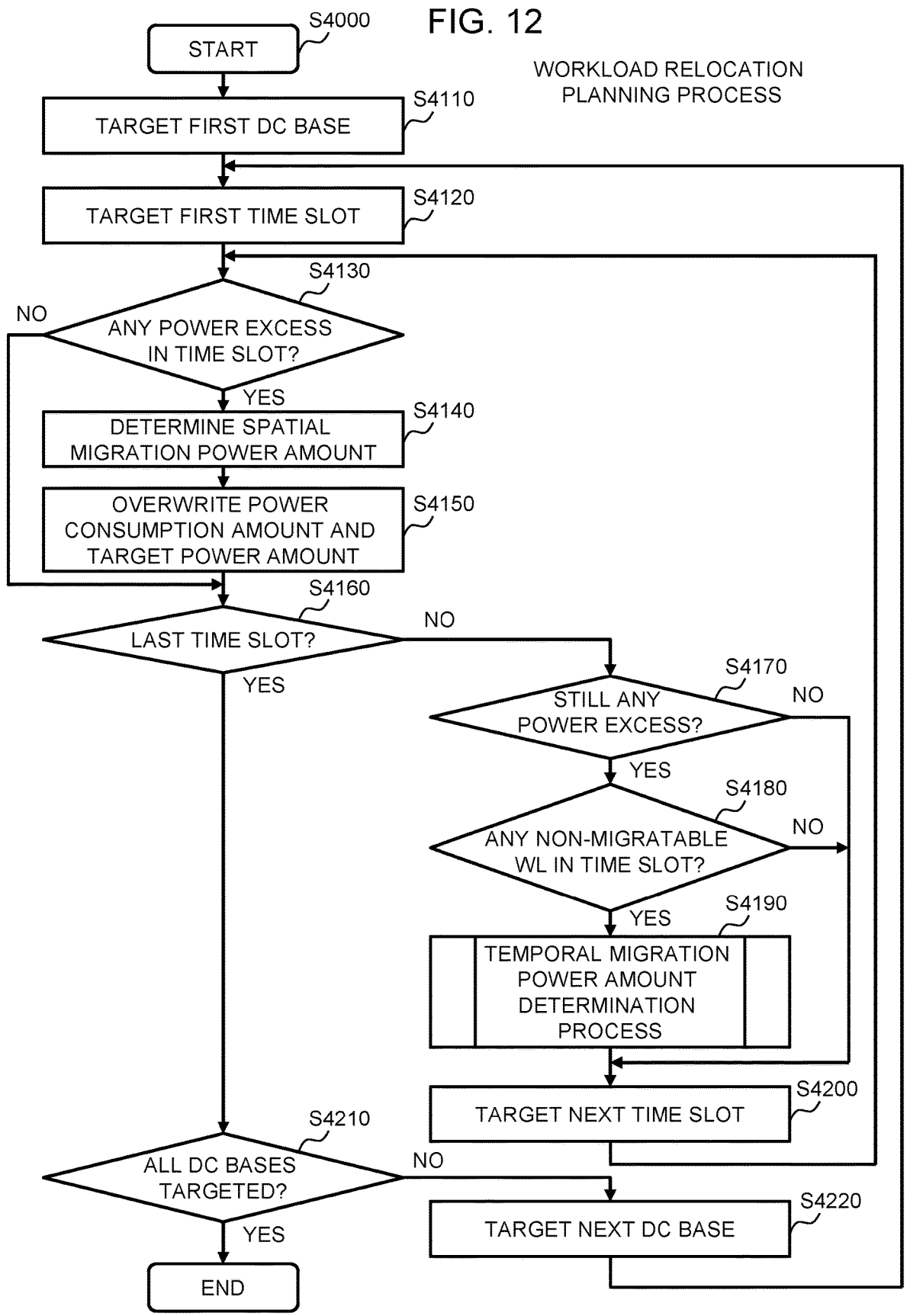
FIG. 12 is a flowchart describing details of a workload relocation planning process.

FIG. 12 is a flowchart describing details of the workload relocation planning process (S4000).

First, in step S4110, the inter-base relocation program 18400 selects the first one out of the DC bases 1000. Any one DC base 1000 can be selected.

Next, in step S4120, the inter-base relocation program 18400 selects the most recent time slot. More specifically, the inter-base relocation program 18400 selects a record of the clock time 12120 indicating the most recent future clock time from the current clock time with reference to the renewable energy power table 12100.

Next, in step S4130, the inter-base relocation program 18400 determines whether or not there is any power excess in a time slot currently targeted. The power excess (amount of excess power) is a positive value obtained by subtracting a predicted amount of a renewable energy power supply (renewable power supply 7000) from a predicted amount of power consumption including calculation resources associated with workload execution in a future time range (time slot) at the DC bases 1000, network equipment (not shown), air conditioning or the like. The calculation resources here are the servers 3000 and the storages 4000.

More specifically, it is determined in the time slot currently targeted whether the value (the power consumption target value 12250—the renewable energy supply amount prediction 12130) is 0 or more. If (the power consumption target value 12250—the renewable energy supply amount prediction 12130) is 0 or more, the inter-base relocation program 18400 determines that there is power excess and proceeds to step S4140. Otherwise, the inter-base relocation program 18400 determines that there is no power excess and proceeds to step S4160.

In step S4140, the inter-base relocation program 18400 determines the power to be spatially relocated in the time slot currently targeted so that the power may be smaller than the sum total of power excess at all the DC bases 1000 in the data center system S as a whole. The inter-base relocation program 18400 preferably ensures that the sum total is minimized. The inter-base relocation program 18400 determines the power for migration to another DC base 1000 from the DC base 1000 currently targeted, based on the amount of renewable energy supplied at the DC bases 1000 collected in step S2000 of the workload control planning process, the power consumption amount data, the spatial migratable time range 12345 of the spatial-migration-oriented workload and the spatial non-migratable time range 12350. The number of migration destination DC bases 1000 need not be singular, but can be plural.

In step S4150, the inter-base relocation program 18400 decreases the DC power consumption amount prediction 12230 in the power demand table 12200 at the DC base 1000 currently targeted and the power consumption target value 12250 by the power amount corresponding to the migration in step S4140. On the other hand, the inter-base relocation program 18400 increases the DC power consumption amount prediction 12230 in the power demand table 12200 at the DC base 1000, the migration destination and the power consumption target value 12250 by the power amount corresponding to the migration.

In step S4160, the inter-base relocation program 18400 determines whether or not the time slot currently targeted is the last time slot. If the time slot is the last one, the inter-base relocation program 18400 proceeds to step S4210; otherwise it proceeds to step S4170.

In the workload control planning process, the user determines in advance how far into the future time slots the plan will cover, which is saved in the storage apparatus 18000 of the inter-base workload control system 10000. For example, if a workload control plan for the next one day is made, the last time slot corresponds to a time slot after 24 hours.

In step S4170, the inter-base relocation program 18400 determines over again whether or not there is power excess in the time slot currently targeted in the same manner as step S4130. If the existence of power excess is determined, the inter-base relocation program 18400 proceeds to step S4180; otherwise it proceeds to step S4200.

In step S4180, the inter-base relocation program 18400 determines whether or not there is any spatial non-migratable workload in the time slot currently targeted. More specifically, the inter-base relocation program 18400 determines whether or not there is any workload in which the execution status 12355 in the workload table 12300 indicates "execution in progress" and in which the time set in the spatial non-migratable time range 12350 includes the clock time of the time slot currently targeted. If there is such a workload, the inter-base relocation program 18400 proceeds to step S4190; otherwise it proceeds to step S4200.

In step S4200, the inter-base relocation program 18400 targets the time slot at the clock time next to the time slot currently targeted and proceeds to step S4130.

In step S4210, the inter-base relocation program 18400 determines whether or not all the DC bases 1000 have been targeted. If all the DC bases 1000 have been targeted, the inter-base relocation program 18400 terminates the workload relocation planning process. If there is any DC base 1000 that remains untargeted, the inter-base relocation program 18400 proceeds to step S4220.

In step S4220, the inter-base relocation program 18400 selects one out of the non-targeted DC bases 1000 as appropriate and makes it the next target. After that, the inter-base relocation program 18400 proceeds to step S4120.

<Temporal Migration Power Amount Determination Process>

Figure 13:
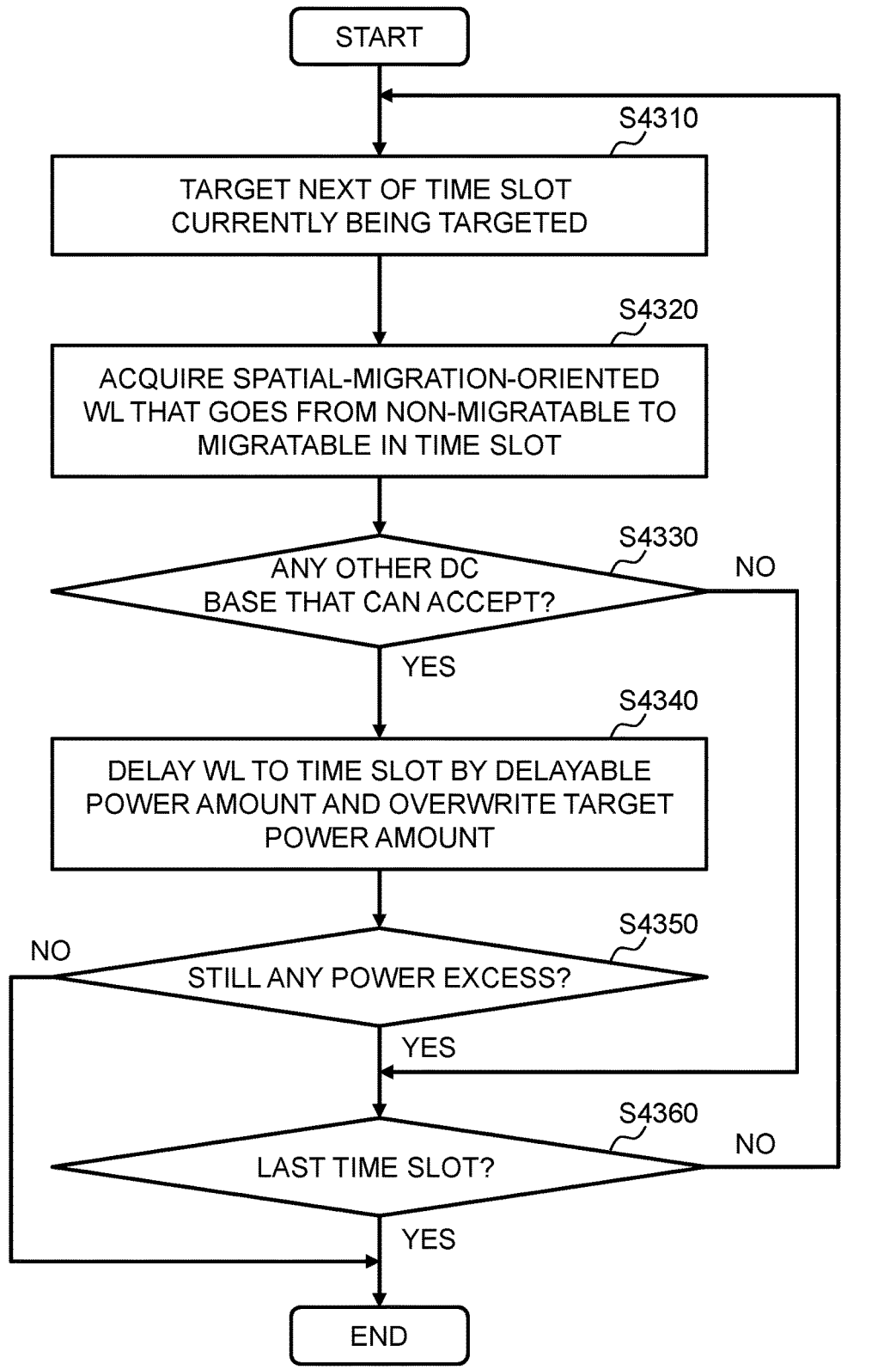
FIG. 13 is a flowchart describing details of a power determination process of temporal migration.

FIG. 13 is a flowchart describing details of a temporal migration power amount determination process (S4190).

First, in step S4310, the inter-base relocation program 18400 targets a time slot next to the time slot currently targeted. The time slot targeted in the temporal migration power amount determination process (S4190) is held independently of the time slot targeted in the workload relocation planning process (S4000). For example, suppose that a certain time slot is targeted in the workload relocation planning process (S4000) and the process in step S4310 is executed for the first time in the temporal migration power amount determination process (S4190). In this case, the inter-base relocation program 18400 targets the time slot next to the clock time of the time slot targeted in the workload relocation planning process (S4000).

However, that never causes the time slot itself held in the inter-base relocation program 18400 to be changed in the workload relocation planning process (S4000). In the temporal migration power amount determination process (S4190), if step S4310 is executed from the second time onward, the inter-base relocation program 18400 targets a time slot next to the previously targeted clock time.

In the description in FIG. 13, the "time slot currently targeted" shall refer to the time slot targeted in the temporal migration power amount determination process (S4190). In other words, the "time slot currently targeted" refers to one different from the time slot targeted in the workload relocation planning process (S4000).

Next, in step S4320, the inter-base relocation program 18400 acquires a workload that is changed from a spatial non-migratable time to a spatial migratable time in the time slot currently targeted. More specifically, the inter-base relocation program 18400 refers to the execution status 12355, the spatial migratable time range 12345 and the spatial non-migratable time range 12350 in the workload table 12300. The inter-base relocation program 18400 acquires records of a spatial-migration-oriented workload showing that the execution status 12355 is execution in progress, the time slot currently targeted is included in the spatial migratable time range 12345 and the preceding time slot is included in the spatial non-migratable time range 12350.

In step S4330, the inter-base relocation program 18400 determines whether or not the spatial-migration-oriented workload acquired in step S4320 can migrate to another DC base 1000. The inter-base relocation program 18400 determines whether or not the DC base 1000, the migration destination, is found in the spatial-migration-oriented workload acquired in step S4320 from the renewable supply amount, the amount of power consumption and the target amount of power consumption of the DC base 1000 or the like saved in the base-by-base data 18100. If even one workload has the migration destination, the inter-base relocation program 18400 proceeds to step S4340; otherwise, it proceeds to step S4360.

In step S4340, the inter-base relocation program 18400 temporally migrates to the time slot from the time slot targeted by the inter-base relocation program 18400 in the workload relocation planning process (S4000). Here, the power amount to be temporally migrated is a power amount up to the power amount of the spatial-migration-oriented workload that spatially migrates to another DC base 1000 in step S4330. The inter-base relocation program 18400 subtracts the power consumption target value 12250 in the power demand table 12200 by the power amount in the time slot targeted in the workload relocation planning process (S4000).

In other words, when the power excess (excess power amount) assumed to still exist in step S4170 is equal to or smaller than a second power adjustment amount migrating through spatial migration of the workload acquired in step S4320, a first power adjustment amount by which to delay is determined in step S4340. Due to the delay by the first power adjustment amount, part or all of the power excess in the corresponding time range moves to the next time range up to the second power adjustment amount.

When the power excess (excess power amount) assumed to still exist in step S4170 exceeds the second power adjustment amount that moves through spatial migration of the workload acquired in step S4320, the first power adjustment amount by which to delay is determined in step S4340. Due to the delay by the first power adjustment amount, part of the power excess in the corresponding time range moves to the next time range up to the second power adjustment amount.

In the process in step S4340, a temporal-migration-oriented workload is migrated to the time slot to be currently targeted in the workload relocation planning process (S4000) from the time range in the targeted time slot in the temporal migration power amount determination process (S4180). In the time slot currently targeted in the temporal migration power amount determination process (S4180), a spatial-migration-oriented workload having a power amount identical or similar to the temporally migrated power amount is migrated to another DC base 1000. Thus, the power amount decreases in the time slot targeted in the workload relocation planning process (S4000), whereas there is no increase or decrease in the time slot currently targeted in the temporal migration power amount determination process (S4180). This is reflected in the power consumption target value 12250 in the power demand table 12200.

In step S4350, the inter-base relocation program 18400 determines whether or not there is any power excess in the time slot targeted in the workload relocation planning process (S4000). This determination is made using a method similar to the method in step S4130 in the workload relocation planning process. When there is power excess, the inter-base relocation program 18400 proceeds to step S4360; otherwise, it terminates the process.

In step S4360, the inter-base relocation program 18400 determines whether or not the time slot currently targeted is the last time slot. This determination is made using a method similar to the method in step S4190 in the workload relocation planning process. If the targeted time slot is the last one, temporal control is not possible after this time slot, and so the inter-base relocation program 18400 terminates the temporal migration power amount determination process. On the other hand, the inter-base relocation program 18400 proceeds to step S4310 if the time slot is not the last one.

<Workload Input Screen>

Figure 14:
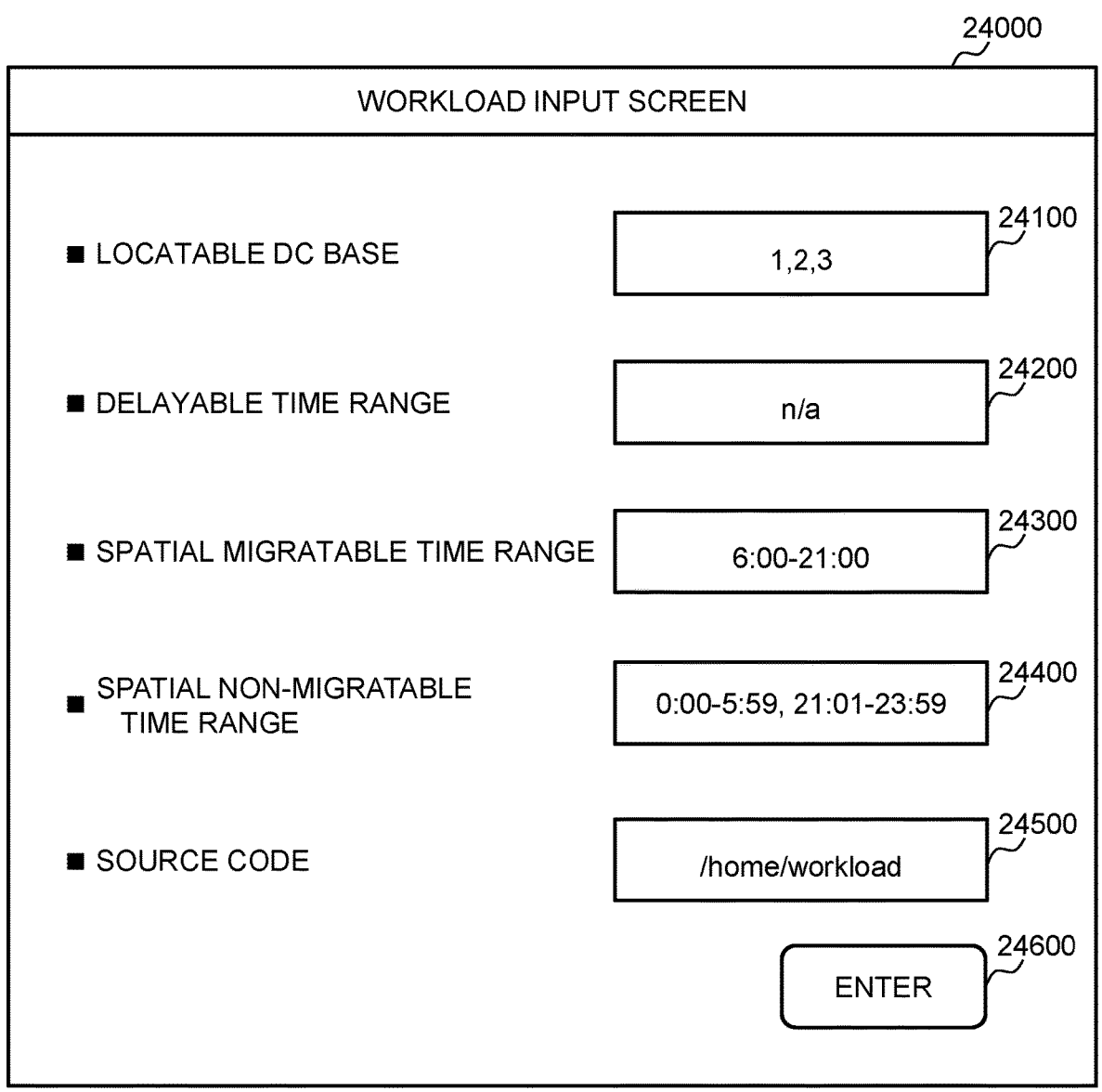
FIG. 14 is a diagram illustrating an example of a workload input screen.

FIG. 14 is a diagram illustrating an example of a workload input screen 24000. The workload input screen 24000 is a screen used by the user to newly input a workload. The workload input screen 24000 is provided with a locatable DC base input form 24100 to specify a DC base 1000 at which a workload to be inputted can be located.

The workload input screen 24000 is provided with a delayable time input form 24200 for the user to input a delayable time if the workload to be inputted is a temporal-migration-oriented workload. Furthermore, the workload input screen 24000 is provided with a spatial migratable time input form 24300 to input a spatial migratable time range when the workload is a spatial-migration-oriented workload. The workload input screen 24000 is provided with a spatial non-migratable time input form 24400 to input a spatial non-migratable time range when the workload is a spatial-migration-oriented workload. The workload input screen 24000 is provided with a source code input form 24500 to specify source code of a workload scheduled to be executed at the DC base 1000 and an enter button 24600 to perform workload input.

The user inputs at least one DC base into the locatable DC base input form 24100. Here, the content inputted is inputted into the executable base 12340 of the workload table 12300 at the DC base 1000 at which the workload is located.

The user inputs a delayable time into the delayable time input form 24200 when the workload to be inputted is a temporal-migration-oriented workload. When the workload execution is not delayable or when the workload is not a temporal-migration-oriented workload, the user inputs 0 or n/a or the user leaves the form blank. The content inputted here is inputted into the delayable time 12335 in the workload table 12300 at the DC base 1000 where the workload is located.

The user inputs a spatial migratable time into the spatial migratable time input form 24300 when the workload to be inputted is a spatial-migration-oriented workload. Although the workload is a spatial-migration-oriented workload, if it cannot be migrated in any time range or when it is not a spatial-migration-oriented workload, the user inputs n/a or leaves the form blank. The content inputted here is inputted into the spatial migratable time range 12345 in the workload table 12300 at the DC base 1000 where this workload is located.

The user inputs a spatial non-migratable time into the spatial migratable time input form 24300 when the workload to be inputted is a spatial-migration-oriented workload. Although the workload is a spatial-migration-oriented workload, if it can be migrated in any time range or when it is not a spatial-migration-oriented workload, the user inputs n/a or leaves the form blank. The content inputted here is inputted into the spatial non-migratable time range 12350 in the workload table 12300 at the DC base 1000 where this workload is located.

A path to the source code of the workload scheduled to be executed by the user in the DC base 1000 is specified in the source code input form 24500. A URL of the source code uploaded to a cloud may be specified or a path of the source code saved in a local storage area may be specified. Instead of specifying a path or a URL, the source code may be directly uploaded.

Once the input is complete, the deployment of the workload starts when the user presses the enter button 24600.

Effects of Embodiments

In the above-described embodiments, the inter-base workload migratable time range, the workload non-migratable time range and the delayable time of execution time within the same base are managed, and spatial migration whereby a workload is relocated between bases and temporal migration whereby a workload is relocated within the same base are performed in combination. By executing spatial migration of workloads between bases and temporal migration within the same base while taking into account the non-migratable time range of workloads, it is possible to efficiently and more accurately adjust power demand at each base so as to improve a renewable energy utilization ratio in the data center system as a whole. In addition, it is possible to achieve a reduction of power consumption in the data center system as a whole and contribute to environment protection. Adjusting the power demand in the whole data center system can also be used as initiatives for local production and local consumption of renewable energy by efficiently utilizing renewable energy generated in the neighborhood.

In the above-described embodiments, after determining a power amount of power excess to be spatially migrated, a power amount of temporal migration is determined so as to adjust power excess that cannot be adjusted by spatial migration. Thus, it is possible to more accurately adjust power demand at each base.

In the above-described embodiments, it is only when a spatial migratable workload is found in the next time range (time slot) that the power amount of power excess in the target time range is temporally migrated assuming the power migration by spatial migration of the workload as an upper limit. It is possible to prevent the power excess from extending in the time range at the migration destination through temporal migration, thereby resulting in a deterioration of power demand adjustment.

In the above-described embodiments, when an amount of temporally migrating excess power is equal to or smaller than a power adjustment amount due to spatial migration of a workload in the next time range (time slot), part or all of the amount of excess power is temporally migrated. In the above-described embodiments, when the amount of temporally migrating excess power exceeds a power adjustment amount due to spatial migration of a workload in the next time range (time slot), part of the amount of excess power is temporally migrated up to this power adjustment amount. It is thereby possible to prevent the power excess from extending in the time range at the migration destination through temporal migration, thereby resulting in a deterioration of power demand adjustment.

In the above-described embodiments, the spatially migrating power amount is determined, a workload is selected based on the power amount during actual migration and then the workload is spatially migrated. In the above-described embodiments, a power amount to be temporally migrated is determined and then a workload is selected based on the power amount during the actual migration and temporally migrated. Thus, by making a whole migration plan on a power amount basis and selecting individual workloads during the actual migration, it is possible to flexibly and steadily adjust power demand.

The present invention is not limited to the above-described embodiments, and can be implemented using any given components without departing from the spirit and scope of the invention. The above-described embodiments or modifications are just examples and the present invention is not limited to these contents as long as the features of the invention are not impaired. Although the various embodiments and modifications have been described, the present invention is not limited to these contents. Other aspects conceivable within the scope of technical thought of the present invention are also included within the scope of the present invention.

For example, some of the functions provided in the respective apparatuses of the present embodiments may be provided in other apparatuses or functions provided in other apparatuses may be provided in the same apparatus.

The configurations of the programs described in the present embodiments are just examples, and, for example, part of each program may be incorporated into other programs or a plurality of programs may be configured as one program.

Although a delayable time is used as executable time range, the executable time range may be specified more specifically.

In the present embodiments, although the case with workloads in the data center has been described as workloads, the present invention is also applicable to information processes executed in other facilities or networks.

In the present embodiments, although the purpose of workload control is primarily to improve the renewable energy utilization ratio as described in Description of the Related Art, the present technology can also be utilized as means for providing coordinating power.

Although the present disclosure has been described with reference to example embodiments, those skilled in the art will recognize that various changes and modifications may be made in form and detail without departing from the spirit and scope of the claimed subject matter.

For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, regarding part of the configuration of each embodiment, it is possible to add, delete, replace, integrate, or distribute the configuration. Furthermore, each configuration and each processing illustrated in the embodiments may be distributed or integrated as appropriate based on processing efficiency or implementation efficiency.

What is claimed is:

1. A data center system comprising:
   a plurality of bases provided with a calculation resource and a renewable energy power supply to execute a workload; and
   an inter-base workload control system to control migration of the workload between the plurality of bases and within a same base, wherein a processor of the inter-base workload control system manages:
   a positive excess power amount obtained by subtracting a predicted amount of power supply of the renewable energy power supply from a predicted amount of power consumption of the calculation resource associated with execution of the workload in a future time range at the bases;
   spatial migratable time range information on a spatial migratable time range where spatial migration is possible and the workload scheduled to be executed in the future time range at the bases can be migrated to another base and a non-migratable time range where such migration is not possible;
   temporal migratable time range information on temporal migration whereby the workload scheduled to be executed in the future time range at the bases is delayed in execution within the same base to be migrated to another time range; and
   a predicted amount of power consumption which is a predicted amount of power consumption of the calculation resource associated with execution of the workload scheduled to be executed in the future time range at the bases,
   determines a power adjustment amount indicating the predicted amount of power consumption that moves through the spatial migration and the temporal migration of the workload scheduled to be executed in the future time range at the bases based on the spatial migratable time range information, the temporal migratable time range information and the predicted amount of power consumption so that a sum total of the excess power amounts in the future time range at the plurality of bases becomes smaller, and
   executes the spatial migration and the temporal migration of the workload based on the power adjustment amount.

2. The data center system according to claim 1, wherein when the amount of excess power exists in the future time range at the bases, the processor determines the power adjustment amount that moves through the spatial migration of the workload scheduled to be executed in a specific time range at a specific base where the amount of excess power exists so that the sum total becomes smaller, and
after the power adjustment amount is determined, if the amount of excess power further exists in the specific time range at the specific base, the processor determines a first power adjustment amount indicating the predicted amount of power consumption that moves through the temporal migration of the first workload scheduled to be executed in the specific time range at the specific base so that the sum total further becomes smaller.

3. The data center system according to claim 2, wherein the processor determines whether or not there is a second workload scheduled to be executed, the spatial migration of which is possible in the time range next to the specific time range, and
when there is the second workload, the spatial migration of which is possible in the time range next to the specific time range, the processor determines a second power adjustment amount indicating the predicted amount of power consumption that moves through the spatial migration of the second workload as the first power adjustment amount.

4. The data center system according to claim 3, wherein when the amount of excess power in the specific time range is equal to or smaller than the second power adjustment amount, the processor determines the first power adjustment amount so that part or all of the amount of excess power in the specific time range moves to the next time range up to the amount of excess power.

5. The data center system according to claim 3, wherein when the amount of excess power in the specific time range exceeds the second power adjustment amount, the processor determines the first power adjustment amount so that part of the amount of excess power in the specific time range moves to the next time range up to the second power adjustment amount.

6. The data center system according to claim 2, wherein the data center system determines the workload to be the spatial migration target in the future time range where the spatial migration is possible based on the power adjustment amount, and executes the spatial migration for the determined workload.

7. The data center system according to claim 2, wherein the data center system determines the workload as the temporal migration target in the future time range where the spatial migration is not possible based on the first power adjustment amount, and executes the temporal migration for the determined workload.

8. An inter-base workload control method executed by an inter-base workload control system, the inter-base workload control system comprising a plurality of bases comprising a calculation resource and a renewable energy power supply to execute a workload to control migration of the workload between the plurality of bases and within a same base, the method comprising steps executed by a processor of the inter-base workload control system managing:

a positive excess power amount obtained by subtracting a predicted amount of power supply of the renewable energy power supply from a predicted amount of power consumption of the calculation resource associated with execution of the workload in a future time range at the base, spatial migratable time range information on a spatial migratable time range where spatial migration of migrating the workload scheduled to be executed in the future time range at the base to another base is possible and a non-migratable time range where such spatial migration is not possible, temporal migratable time range information on temporal migration of delaying execution of the workload scheduled to be executed in the future time range at the base within a same base and migrating the workload to another time range and a predicted amount of power consumption which is a predicted amount of power consumption of the calculation resource associated with execution of the workload scheduled to be executed in the future time range at the base, determining a power adjustment amount indicating the predicted amount of power consumption that moves through the spatial migration and the temporal migration of the workload scheduled to be executed in the future time range at the bases based on the spatial migratable time range information, the temporal migratable time range information and the predicted amount of power consumption so that a sum total of the excess power amounts in the future time range at the plurality of bases becomes smaller; and executing the spatial migration and the temporal migration of the workload based on the power adjustment amount.

9. An inter-base workload control system to control migration of a workload between a plurality of bases and within a same base comprising a calculation resource and a renewable energy power supply to execute the workload, wherein a processor of the inter-base workload control system manages:

a positive excess power amount obtained by subtracting a predicted amount of power supply of the renewable energy power supply from a predicted amount of power consumption of the calculation resource associated with execution of the workload in a future time range at the base;

spatial migratable time range information on a spatial migratable time range where spatial migration of migrating the workload scheduled to be executed in the future time range at the base to another base is possible and a non-migratable time range where such spatial migration is not possible;

temporal migratable time range information on temporal migration of delaying execution of the workload scheduled to be executed in the future time range at the base within a same base and migrating the workload to another time range; and a predicted amount of power consumption which is a predicted amount of power consumption of the calculation resource associated with execution of the workload scheduled to be executed in the future time range at the base, determines a power adjustment amount indicating the predicted amount of power consumption that moves through the spatial migration and the temporal migration of the workload scheduled to be executed in the future time range at the bases based on the spatial migratable time range information, the temporal migratable time range information and the predicted amount of power consumption so that a sum total of the excess power amounts in the future time range at the plurality of bases becomes smaller, and executes the spatial migration and the temporal migration of the workload based on the power adjustment amount.

* * * * *